Oct. 25, 1932. J. A. McCORMICK 1,884,050
CONNECTING ROD CONSTRUCTION
Filed Oct. 10, 1930
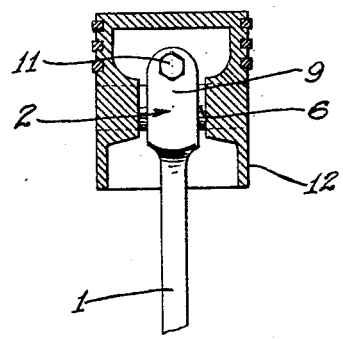
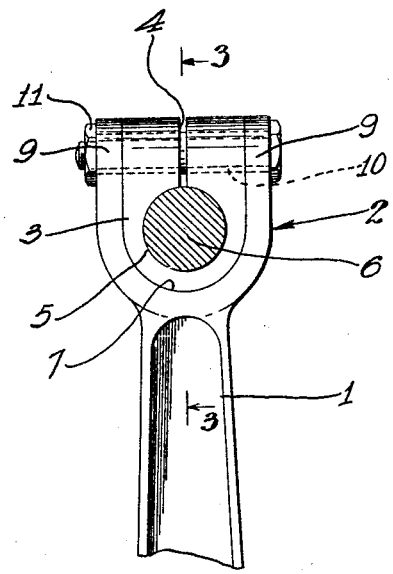
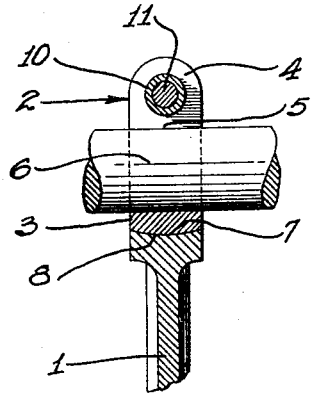
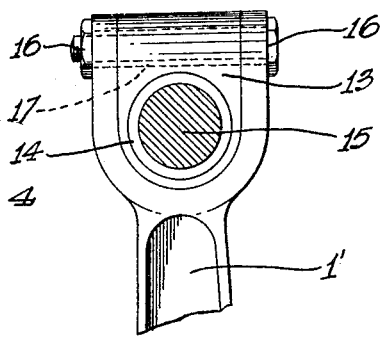
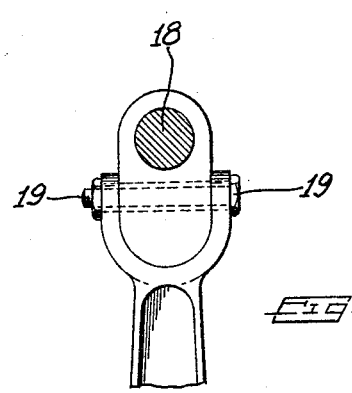
James A. McCormick
INVENTOR
ATTORNEYS Patented Oct. 25, 1932

1,884,050

UNITED STATES PATENT OFFICE

JAMES A. McCORMICK, OF MORRIS, ILLINOIS

CONNECTING ROD CONSTRUCTION

Application filed October 10, 1930. Serial No. 487,860.

My invention relates to improvements in connecting rod constructions, and it consists in the combinations, constructions, and arrangements herein described and claimed.

An object of my invention is to provide a connecting rod construction in which means is employed whereby the piston in an internal combustion engine automatically aligns with the cylinder wall, and in which the necessity for aligning jigs and the like during the assembly of the engine is entirely dispensed with.

A further object is to provide a device of the type described in which a minimum amount of wear takes place between the piston and its associated cylinder, and in which compression is more easily maintained, and at the same time preventing leakage of gas and oil beyond the piston.

Other objects and advantages will appear in the following specification, and the novel features of the invention will be particularly pointed out in the appended claim.

My invention is illustrated in the accompanying drawing, forming part of this application, in which Figure 1 is a sectional view of a piston, Figure 2 is a side elevation of a connecting rod embodying my invention, Figure 3 is a sectional view taken along the line 3—3 of Figure 2, Figure 4 is a slightly different form of my device, and Figure 5 is a further modification.

In carrying out my invention, I make use of a connecting rod 1 which is bifurcated as at 2, see Figure 2, for receiving a block 3. The block is split as at 4 and is provided with an opening 5 for receiving a piston pin 6. The bifurcated portion is concave as at 7, while the block is convex as at 8. The concave portion has bearing relation with the convexed portion. The block and the side portions 9 are provided with openings for receiving a sleeve 10 and a bolt 11. The piston pin 6 is frictionally rigid with respect to the block 3 by reason of the slot 4.

The piston pin 6 is associated with a piston 12 in the usual manner. The connecting rod 1 may be pivoted independently of the block 3 about the bolt 11 as its axis. Any relative movement between the block and the connecting rod causes a sliding action between the surfaces 7 and 8 which are shown in Figure 3. The construction is such that the piston automatically aligns should any of the associated parts be out of alignment. At the present time it is important that the piston be perfectly aligned with respect to the cylinder wall. This process requires aligning jigs, and even with such instruments, it is a difficult matter to properly align the assembly. My invention permits the piston to have a consistent bearing relation with the cylinder. I have eliminated the tendency of uneven wear; proper compression may be maintained; and at the same time oil and fuel leakage is largely eliminated.

In Figure 4 I have shown a construction in which a non-split block 13 is provided with a bushing 14 for receiving a piston pin 15. The piston pin is rotatably mounted within the bushing, while the latter is frictionally fixed in the block 13, and the block is movably mounted in the bifurcated head of the connecting rod 1' through the medium of a bolt 16. A sleeve 17 is preferably provided for lining openings through the block and the bifurcated head. The block is of course provided with a convexed bearing surface which bears against a concaved surface associated with the bifurcated portion.

The structure shown in Figure 5 is a slightly different form in which the block differs in that the relative positions of a piston pin 18 and a connecting bolt 19 are reversed; otherwise the construction and operation are identical with that disclosed in Figure 4. All of the forms embody a construction in which a perfect alignment is automatically attained.

While the invention has been shown and described in connection with a piston and connecting rod associated with an internal combustion engine, it will be understood that the invention is equally applicable to various arts employing pistons, connecting rods, etc. The invention is of particular importance in such structures as pumps, compressors, and similar devices.

I claim:

A connecting rod provided with a bifurcated head, a block pivotally connected with the head having a transverse opening and having a bearing relation with the head, and a piston pin provided with a concentrically and rotatably mounted sleeve, said pin projecting through the transverse opening in the block, the block and said bifurcated head being provided with aligned openings, a bolt extending through said openings and being provided with a rotatably mounted sleeve disposed in the opening in said block, said bolt passing through the aligned openings for holding the block in assembled relation with the bifurcated head, said second-mentioned sleeve passing through the opening of the block and forming a bearing for the block, said block being provided with a convex bearing surface, said connecting rod being provided with a concave bearing surface in sliding engagement with the convex bearing surface of said block.

JAMES A. McCORMICK.